March 25, 1969    G. T. PETERS ETAL    3,434,569
DYNAMIC BRAKING SYSTEM FOR WHEELED VEHICLES
Filed July 20, 1967
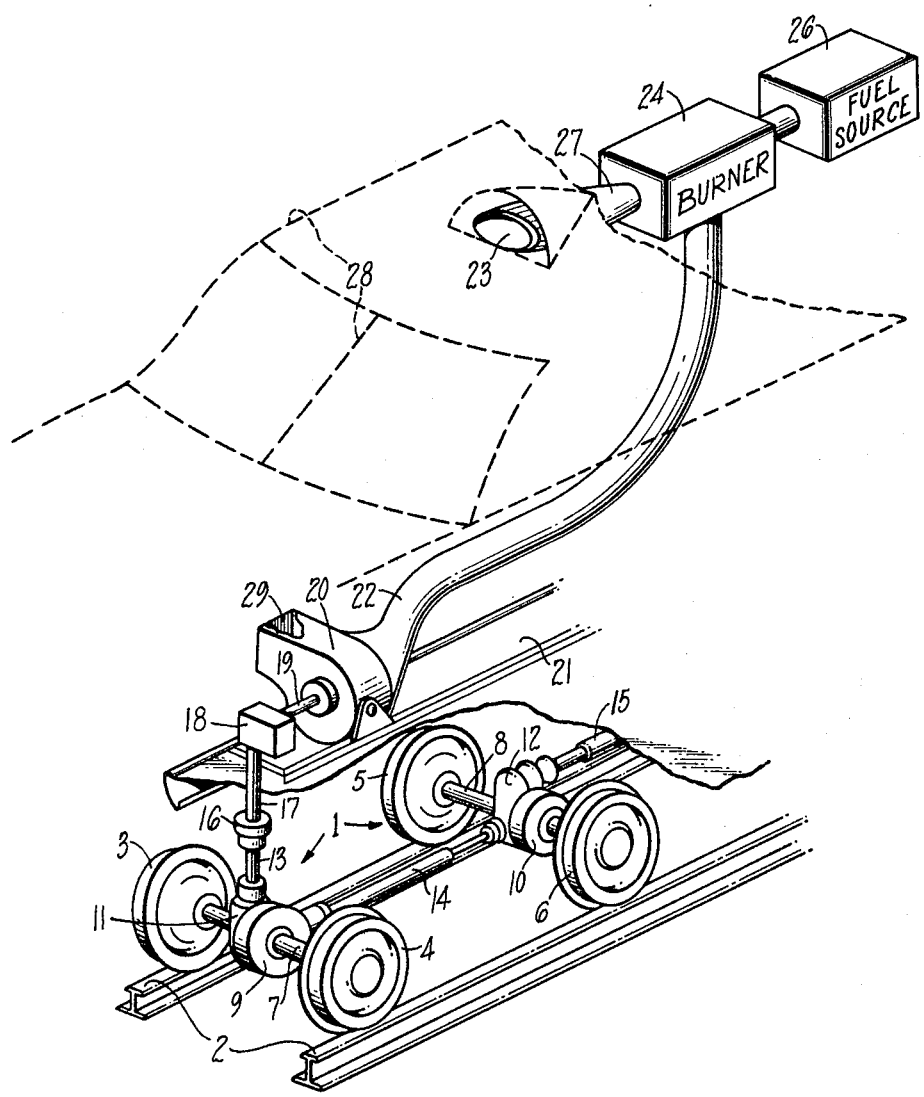
INVENTORS
GEORGE T. PETERS
CHARLES OICKLE, JR.
BY *Melvin Pearson Williams*
ATTORNEY United States Patent Office 3,434,569
Patented Mar. 25, 1969

3,434,569
DYNAMIC BRAKING SYSTEM FOR WHEELED VEHICLES
George T. Peters, Farmington, and Charles Oickle, Jr., New Britain, Conn., assignors to United Aircraft Corporation, East Hartford, Conn., a corporation of Delaware
Filed July 20, 1967, Ser. No. 654,785
Int. Cl. B60t 1/00, 7/12; B64c 25/68
U.S. Cl. 188—2                                       2 Claims

ABSTRACT OF THE DISCLOSURE

The wheels of a vehicle are connected through a suitable power train to drive an air compressor for compressing atmosphere which dissipates some of the energy in the rotating axle, the compressed atmosphere being utilized to supply reverse thrust so as to add an additional braking factor to the dynamic braking capability of the vehicle; the compressed atmosphere may be heated to further increase the reverse thrust for additional braking power.

BACKGROUND OF THE INVENTION

Field of invention

This invention relates to a dynamic braking system for a wheeled vehicle and more particularly to a system which converts kinetic energy in a wheeled vehicle into reverse thrust braking action.

Description of the prior art

In the prior art, the dynamic braking of wheeled vehicles has included the use of turbo-brakes which dissipate kinetic energy of wheels or rolling axles in air-work devices. In such a brake system, work is performed on air, such as by compressor blades, solely for the purpose of dissipating energy. Other devices known in the prior art include the use of propellers at the front of vehicles so as to create reverse thrust, said propellers being driven by special motors or by the power available in the main engine of the vehicle.

With the advance of high-speed land vehicles, such as high-speed trains, it is necessary to provide the utmost in braking capability.

SUMMARY OF INVENTION

An object of the invention is to provide an improved dynamic braking system for a wheeled vehicle.

According to the present invention, the kinetic energy in a wheeled vehicle to be decelerated is dissipated by using the energy to compress atmosphere or other suitable gas, the compressed atmosphere or other suitable gas being discharged in a direction opposite to the direction of motion of the vehicle, whereby the dissipated energy is utilized to provide braking thrust.

In further accordance with the present invention, the compressed atmosphere or other suitable gas may be combusted prior to expansion through a nozzle so as to provide additional reverse thrust.

The foregoing and other objects, features and advantages of the present invention will become more apparent in the light of the following detailed description of preferred embodiments thereof as illustrated in the accompanying drawing.

BRIEF DESCRIPTION OF THE DRAWING

The sole figure herein comprises a simplified, partially broken-away view of the running gear of a wheeled vehicle, with portions of the vehicle shown in phantom, illustrating one embodiment of the present invention.

DESCRIPTION OF THE PREFERRED EMBODIMENT

In the figure, the wheeled vehicle is illustrated as comprising the locomotive of a train, traveling from right to left, and having running gear 1 adapted to roll on a pair of tracks 2. The running gear includes four wheels 3–6, disposed on corresponding axles 7, 8, each of the axles coupled to a take-off gear box 9, 10 which may be further connected through suitable gearing 11, 12 to suitable drive shafts 13, 14. Each of the axles 7, 8 may be coupled to a drive shaft 14, 15 from a previous axle in a sequence. By utilizing the kinematic relations between wheels, axles, and drive shafts as shown, the braking effort of a large number of wheels may be employed so as to effect a positive conversion of energy from the rotation of the wheels 4–6, to rotation of shaft 13. Shaft 13 may be coupled to a suitable clutch 16 which may additionally be provided actuating means responsive to a braking control to engage upon a signal indicating the initialization of deceleration. The output of the clutch 16 may be coupled through a shaft 17 to a suitable right angle gear box 18 so as to provide rotary power to an input shaft 19 of a compressor 20, the compressor 20 shown herein is illustrated as being in the form of a squirrel cage fan, but may comprise instead the fan portion of a turbofan jet aircraft engine or any other suitable form that will utilize rotational energy to compress atmosphere or other suitable gas. The compressor 20 is mounted on a suitable frame portion 21 of the vehicle, and is connected to a suitable source of gas, such as an atmospheric inlet 29.

The output of the compressor 20 to fed through duct work 22 to the utilization means which may comprise a variable area exhaust nozzle 23. The nozzle 23 may be mounted in any suitable place, such as at the top of the cab 28 shown in phantom. The utilization means may additionally comprise a burner 24 (between the compressor 20 and the nozzle 23) which can add further to the thrust force by heating the gas, to increase the amount of expansion that takes place at the nozzle. The burner 24 may comprise any suitable form of combustion device, into which fuel is being fed from a source 26 so as to utilize the compressed air or gas in the duct 22 as the oxidizer for the fuel. The burning of fuel within the burner 24 will cause a significant addition of heat to the gas supplied to the burner 24 by the duct 22, thereby providing additional thrust through the variable area exhaust nozzle 23 which is connected to the burner 24 by a duct 27. Alternatively, a gaseous fuel may be compressed and burned so as to convert kinetic energy and supply reverse thrust. The variable area exhaust nozzle 23 may comprise any suitable form of controllable nozzle, of the type utilized in aircraft jet engines, of which there is a plethora known to the prior art. Control of this nozzle may be either static or dynamic, depending upon the particular application of the invention herein. For instance, a nozzle may be adjusted to the particular locomotive to suit the speeds and stopping requirements of a given run, or the nozzle may be dynamically adjusted within each deceleration operation so as to provide optimum reverse thrust at all pressures, without regard to the speed of the wheels. The operation and control of such a variable area exhaust nozzle is well known in the prior art, and will not be expanded upon herein.

Thus, the present invention provides dissipation of kinetic energy in the running gear of a vehicle in combination with the utilization of such energy to provide additional braking power through reverse thrust. In addition, an increase in the reverse thrust capability of the present invention is provided by means of a burner which greatly increases the temperature of the gas compressed by the kinetic energy of the vehicle so as to provide a large amount of thrust for decelerating the vehicle.

Although the invention has been shown and described with respect to preferred embodiments thereof, it should be understood by those skilled in the art that the foregoing and other changes and omissions in the form and detail thereof may be made therein without departing from the spirit and scope of the invention.

Having thus described typical embodiments of our invention, that which we claim as new and desire to secure by Letters Patent of the United States is:

1. A braking system for a wheeled vehicle comprising:
a compressor means driven by the rolling running gear of said vehicle for operating said compressor; and
a reverse thrust nozzle disposed on said vehicle oriented so that thrust created thereby is opposite to the primary direction of travel of said vehicle, said reverse thrust nozzle connected to said compressor so as to receive compressed fluid delivered thereby, whereby the energy in said rotating running gear is dissipated, and the energy so dissipated is utilized to provide additional deceleration through reverse thrust.

2. The braking system according to claim 1 additionally comprising:
means, connected between said compressor and said reverse thrust nozzle, for increasing the temperature of the gas supplied by said compressor by several orders of magnitude, thereby to enhance the reverse thrust deceleration action of said nozzle.

References Cited

UNITED STATES PATENTS

| 2,376,647 | 5/1945 | Akins | 115—1 |
| 3,064,762 | 11/1962 | Zizzi | 188—2 |
| 3,338,169 | 8/1967 | Kinney | 115—14 X |

FOREIGN PATENTS

| 866,143 | 2/1953 | Germany. | |

MILTON BUCHLER, *Primary Examiner.*

THOMAS W. BUCKMAN, *Assistant Examiner.*

U.S. Cl. X.R.

188—110; 244—110